United States Patent [19]

Shaffer

[11] 4,056,989
[45] Nov. 8, 1977

[54] VEHICLE DRIVE

[75] Inventor: Walter M. Shaffer, Peoria, Ill.

[73] Assignee: Caterpillar Tractor Co., Peoria, Ill.

[21] Appl. No.: 691,053

[22] Filed: May 28, 1976

[51] Int. Cl.² ............... F16H 3/02; F16H 47/00; F16H 15/08

[52] U.S. Cl. ................... 74/745; 74/732; 74/200

[58] Field of Search ............ 74/745, 730, 731, 732, 74/691, 640, 200; 60/493

[56] References Cited

U.S. PATENT DOCUMENTS

| | | | |
|---|---|---|---|
| 2,716,357 | 8/1955 | Rennerfelt | 74/691 |
| 2,786,363 | 3/1957 | Davies et al. | 74/200 |
| 3,005,562 | 10/1961 | Shaffer | 214/701 |
| 3,173,311 | 3/1965 | Seliber | 74/731 |
| 3,248,960 | 5/1966 | Schottler | 74/200 |
| 3,274,856 | 9/1966 | Harrison | 74/745 X |
| 3,397,587 | 8/1968 | Saussele | 74/200 |
| 3,802,284 | 4/1974 | Sharpe et al. | 74/200 |

*Primary Examiner*—Samuel Scott
*Assistant Examiner*—Lance W. Chandler
*Attorney, Agent, or Firm*—Phillips, Moore, Weissenberger, Lempio & Majestic

[57] ABSTRACT

A drive system for a vehicle includes a fluid pump which drives a fluid motor which in turn drives a variable speed transmission of the type including an input toroidal disc, an output toroidal disc, and wheel means rollingly connecting the input and output discs, with the output disc being used to drive the vehicle.

4 Claims, 1 Drawing Figure

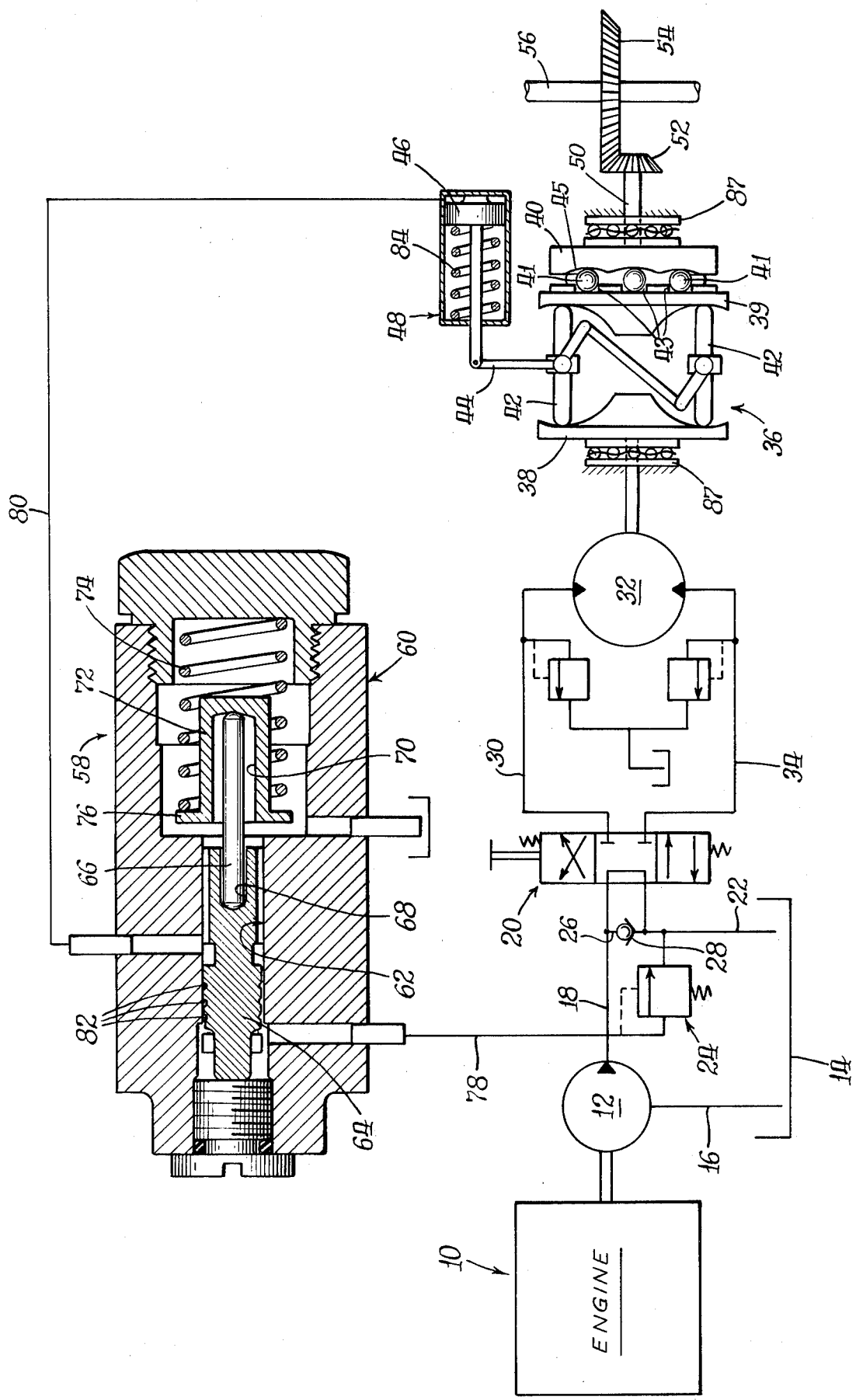

VEHICLE DRIVE

BACKGROUND OF THE INVENTION

This invention relates to drive system for a vehicle, and more particularly, to a fluid drive system incorporating a variable speed transmission.

In general, it is well known to provide a drive for a lift truck which includes an internal combustion engine connected to a two-speed manual shift transmission coupled with an oil clutch. It will be understood that while such a drive system is relatively efficient in operation, it is always desirable to achieve more efficient application of engine power and easier, and more precise control of the vehicle's motion, at a low cost. For this purpose, it would clearly be desirable to provide a fixed displacement fluid pump in combination with a fixed displacement fluid motor and further in combination with reasonably-priced means for providing an infinitely variable transmission for highly efficient driving of the vehicle.

It has been found that automatic and hydrostatic transmissions, each providing a plurality of speeds, increase overall operating efficiency of the vehicle, but at a relatively high cost.

U.S. Pat. No. 2,716,357 discloses an infinitely variable transmission of the general type utilized in the present invention, and U.S. Pat. No. 2,786,363 provides an in-depth study of the theoretical basis for such an infinitely variable transmission. The teachings of these patents are hereby specifically incorporated by reference.

U.S. Pat. No. 3,005,562 discloses a hydraulic drive for a lift truck incorporating a pressure-sensitive valve for varying the displacement of the motors for driving the truck.

SUMMARY AND OBJECTS OF THE INVENTION

It is accordingly an object of this invention to provide a drive system for a vehicle wherein a fluid pump and fluid motor are operatively connected with a variable speed transmission having an infinite number of ratios.

It is a further object of this invention to provide a drive system for a vehicle which, while fulfilling the above object, is extremely simple in use and efficient in operation.

Broadly stated, the invention comprises a drive system for a vehicle or the like comprising a fluid pump, and means for driving the fluid pump. Further included is a fluid motor, and means operatively connecting said fluid pump and fluid motor, so that driving of said fluid pump drives said motor. Further included is a variable speed transmission, having an infinite number of ratios, operatively coupled with said motor.

BRIEF DESCRIPTION OF THE DRAWINGS

These and other objects of the invention will become apparent from a study of the following specification and drawing, which is an overall schematic view of the drive system of the vehicle.

DESCRIPTION OF THE PREFERRED EMBODIMENT

Shown in the drawing is the engine 10 of a lift truck or the like (not shown), such engine 10 being connected to a fixed displacement fluid pump 12 for the driving thereof. The pump 12 takes fluid from the reservoir 14 through a conduit 16, and pumps such fluid through a conduit 18 to a valve 20 which in the position shown feeds the fluid back to the reservoir 14 through conduit 22. Excessive pressure build-up which may occur in the conduit 18 is released to the reservoir 14 through a relief valve 24. Yet another conduit 26 communicates the conduit 18 with the reservoir 14, and make-up valve 28 is included therein to allow fluid to be drawn from the reservoir 14 into the conduit 18 as necessary.

With the valve 20 shifted to an upper position as shown in the drawing, fluid will flow through the conduit 18, through a conduit 30 and through a fixed displacement fluid motor 32, from the motor 32, and through a conduit 34 back to the reservoir 14. Moving the valve 20 to a lowermost position will reverse the flow of fluid through the motor 32, the motor 32 being of the reversible type, so that the fluid motor 32 is driven in the opposite direction.

A variable speed transmission 36 is operatively coupled with the motor 32. The variable speed transmission 36 includes an input toroidal disc 38, an output toroidal disc 39 spaced therefrom, and a plurality of wheels 42 rollingly interconnecting the input toroidal disc 38 and output toroidal disc 39. The plurality of wheels 42 are variable in angularity or position relative to the input toroidal disc 38 and output toroidal disc 39 through the movement of a lever 44, through movement of a piston 46 in a cylinder 48, all generally in accordance with the teachings of U.S. Pat. Nos. 2,716,357 and 2,786,363.

In accordance with the teachings of such patents, such variation in the positioning of the wheels 42 relative to the input and output discs 38, 39 varies the speed of the output disc 39 in relation to the speed of the input disc 38. Since it will be seen that the wheels 42 may be placed in an infinite number of positions of angularity relative to the discs 38, 39, a variable speed transmission 36 having an infinite number of ratios is provided.

The output toroidal disc 39 is operatively coupled with a main output disc 40 by means of steel balls 41, each held by and rollable within grooves 43 defined by the disc 39, and in rolling engagement with ramps 45 defined by main output disc 40.

The main output disc 40 drives a shaft 50 having a bevel gear 52 fixed thereto in engagement with a bevel gear 54 which drives the final drive axle 56 of the vehicle.

Valve means are included as shown at 58, including a valve body 60 defining a bore 62 having a spool 64 reciprocable therein. A shaft 66 is seated in a recess 68 in the spool 64, and also in a recess 70 defined by a cap 72, a resilient spring 74 being interposed between an end of the body 60 and a flange 76 of the cap 72, so that the spring 74 urges the spool 64 into a leftward position as shown in the drawing. A conduit 80 is provided, communicating the cylinder 48 at the head end of the piston 46 with the bore 62. With the spool 64 in its fully leftward position, the conduits 78, 80 are blocked from communication by such spool 64.

During operation of the system, assuming conditions wherein, for example, the vehicle is going up a grade, fluid pressure in the line 18 increases, such pressure being conducted to the bore 62 adjacent the leftward end of the spool 64. Such pressure acts on the spool 64 to move the spool rightwardly against the resilience of the spring 74 to bring metering slots 82 into communication with the conduit 80 (i.e. opening the valve means 58), whereby fluid pressure is allowed to exit from the bore 62, being conducted through the conduit 80 to the head end of the piston 46. The piston 46 under such pressure is moved against the resilience of a spring 84 within the cylinder 48, to vary the angular position of the wheels 42 to change the transmission ratio in accordance with the descriptions in U.S. Pat. Nos. 2,716,357 and 2,786,363. Thus, the valve 58 is responsive to fluid pressure in the conduit 18 to vary the position of the wheels 42.

As the torque required by the shaft 50 increases, the roller and ramp system provides increasing thrust between the disc 39 and disc 40, in turn providing greater thrust against wheels 42 to ensure that sufficient frictional force between wheels 42 and discs 38, 39 exists. Thrust bearings 87 are provided outward of the disc 38 and disc 40 to properly carry such thrust forces.

Under the force of such pressure, the spool 64 will move rightwardly until the pressure applied to the piston 46 moves the wheels 42 to satisfy the torque requirements of the drive condition of the vehicle. Upon decrease in fluid pressure in the conduit 18, the valve spool 64 will move leftwardly under the resilience of the spring 74 (i.e. the valve 58 closing), to allow the piston 46 to move under the resilience of the spring 84 to move the wheels 42 back toward the initial positions thereof.

Since the pressure in conduit 18 is being sensed, the movement of the spool 64 will be directly responsive to overall conditions of the fluid circuit. Such conditions depend on the drive operating characteristics of the vehicle, i.e. whether the vehicle is climbing a hill, whether the vehicle is under partial or full power, and so on.

It will be seen that the overall system is extremely efficient in operation, being of low cost in construction, utilizing a fixed displacement fluid pump and a fixed displacement fluid motor in combination with a variable speed transmission. The variable speed transmission provides for extremely high overall operating efficiency of the vehicle utilizing such system.

What is claimed is:

1. A drive system for a vehicle or the like comprising:
a fluid pump;
means for driving said fluid pump;
a fluid motor;
means operatively connecting said fluid pump and fluid motor so that driving of said fluid pump drives said fluid motor; and
a variable speed transmission having an infinite number of ratios operatively coupled with said motor, wherein the variable speed transmission comprises an input disc driven by said motor, an output disc, and wheel means rollingly interconnecting the input disc and output disc, with the wheel means being variable in position relative to the input disc and output disc to vary the speed of the output disc in relation to the speed of the input disc, and means for varying the position of the wheel means relative to the input and the output discs to in turn vary the speed of the output disc in relation to the speed of the input disc, wherein the means varying the position of the wheel means comprise means operatively coupled with said wheel means and responsive to fluid pressure in said means operatively coupling said fluid pump and fluid motor.

2. The apparatus of claim 1 wherein the fluid motor comprises a reversible fluid motor for driving the input disc in one and the other opposite directions, and means connected with said means operatively connected with the fluid pump and fluid motor for selectively driving the motor in one and the other opposite directions.

3. The apparatus of claim 1 wherein the means operatively connected with the wheel means and responsive to fluid pressure comprise valve means communicating with fluid pressure in said means operatively connecting said fluid pump and said fluid motor, openable upon increase in fluid pressure applied thereto, and closable upon decrease in fluid pressure applied thereto.

4. The apparatus of claim 3 wherein the valve means comprise a valve body defining a bore communicating with fluid pressure in said means operatively connecting said fluid pump and said fluid motor, a spool reciprocable in said bore, resilient means biasing the spool in one direction relative to the valve body, an increase in fluid pressure applied to said bore acting on the spool to move against the resilient means to allow fluid pressure to exit from the bore.

* * * * *